(12) United States Patent
Sun et al.

(10) Patent No.: US 8,783,644 B2
(45) Date of Patent: Jul. 22, 2014

(54) PNEUMATIC FLOW CONTROL VALVE FOR FIRE SUPPRESSION OVER PRESSURE PREVENTION

(75) Inventors: Fanping Sun, Glastonbury, CT (US); Zaffir Chaudhry, South Glastonbury, CT (US); Muhidin A. Lelic, Manchester, CT (US); Mihai Dorobantu, West Hartford, CT (US); Stevo Mijanovic, Manchester, CT (US); Lisa A. Prill, Glastonbury, CT (US); Umesh G. Vaidya, Manchester, CT (US)

(73) Assignee: Chubb International Holdings Limited (GB)

( * ) Notice: Subject to any disclaimer, the term of this patent is extended or adjusted under 35 U.S.C. 154(b) by 1350 days.

(21) Appl. No.: 11/918,094

(22) PCT Filed: Apr. 7, 2005

(86) PCT No.: PCT/US2005/012791
§ 371 (c)(1),
(2), (4) Date: Aug. 20, 2009

(87) PCT Pub. No.: WO2006/110149
PCT Pub. Date: Oct. 19, 2006

(65) Prior Publication Data
US 2010/0288517 A1    Nov. 18, 2010

(51) Int. Cl.
*F16K 31/124*    (2006.01)
*B60G 17/00*    (2006.01)
(52) U.S. Cl.
USPC .................... 251/30.03; 251/44; 280/6.153

(58) Field of Classification Search
USPC ................ 251/26, 35, 43, 44, 30.01–30.03
See application file for complete search history.

(56) References Cited

U.S. PATENT DOCUMENTS

| | | | | |
|---|---|---|---|---|
| 837,077 | A * | 11/1906 | Kupsch | 251/35 |
| 858,063 | A * | 6/1907 | Delany | 251/43 |
| 1,412,905 | A * | 4/1922 | Titus | 251/36 |
| 1,961,599 | A * | 6/1934 | Schwitzer et al. | 251/14 |
| 1,989,341 | A * | 1/1935 | Shenton | 251/30.04 |

(Continued)

FOREIGN PATENT DOCUMENTS

| | | |
|---|---|---|
| EP | 0010465 A2 | 4/1980 |
| EP | 0284722 | 10/1988 |
| EP | 066087 | 8/1995 |
| WO | 2004079678 A2 | 9/2004 |

OTHER PUBLICATIONS

European Patent Office, Office Action, Mar. 24, 2011, 6 pages.
European Search Report, mailed Dec. 3, 2010.

(Continued)

*Primary Examiner* — John K Fristoe, Jr.
*Assistant Examiner* — Daphne M Barry
(74) *Attorney, Agent, or Firm* — Cantor Colburn LLP

(57) ABSTRACT

A controlled pressure release valve includes a valve body having a gas inlet for connection to a gas container and a gas outlet for delivering gas to a protected area. The controlled valve comprises a slidable spool housed in the valve body that is slidable between a first position and a second position. The slidable spool has a first end and a second end. A primary flow passage connects the gas inlet and the gas outlet and increases with lineal movement of the slidable spool. The sliding spool is biased towards the first position by a gas pressure applied by the second chamber and a spring.

20 Claims, 10 Drawing Sheets

(56) References Cited

U.S. PATENT DOCUMENTS

| | | | |
|---|---|---|---|
| 2,398,775 A | | 4/1946 | Beekley et al. |
| 2,634,754 A | * | 4/1953 | Rahn .............................. 251/31 |
| 2,755,058 A | * | 7/1956 | Margrave ........................ 251/43 |
| 2,958,503 A | * | 11/1960 | Vaughn ....................... 251/30.02 |
| 3,010,691 A | | 11/1961 | Canfield |
| 3,052,304 A | | 9/1962 | Williamson et al. |
| 3,612,476 A | | 10/1971 | Leitgeb |
| 3,687,160 A | | 8/1972 | Erickson et al. |
| 3,875,849 A | | 4/1975 | Patel |
| 4,393,890 A | * | 7/1983 | Skappel ........................ 137/78.2 |
| 4,682,531 A | | 7/1987 | Mayer |
| 4,989,564 A | * | 2/1991 | Cook et al. ............... 123/339.27 |
| 5,294,089 A | | 3/1994 | LaMarca |
| 5,645,263 A | | 7/1997 | Aardema |
| 5,738,332 A | * | 4/1998 | Perez Corbalan .............. 251/45 |
| 6,220,565 B1 | | 4/2001 | Yonezawa et al. |
| 6,851,657 B2 | * | 2/2005 | Tawns ........................ 251/30.03 |
| 7,669,830 B2 | | 3/2010 | Franconi |
| 7,815,162 B2 | | 10/2010 | Entwistle et al. |
| 2004/0194977 A1 | | 10/2004 | Stilwell et al. |
| 2006/0180207 A1 | | 8/2006 | Itano et al. |

OTHER PUBLICATIONS

International Preliminary Report on Patentability, International Application No. PCT/US2005/047324, filed Dec. 22, 2005, 5 pages.
International Search Report and Written Opinion, dated Mar. 12, 2009, International Application No. PCT/US2008/088414, filed Dec. 29, 2008, 4 pages.
International Search Report and Written Opinion, dated May 31, 2006, International Application No. PCT/US2005/047324, filed Dec. 22, 2005, 6 pages.

* cited by examiner

PNEUMATIC FLOW CONTROL VALVE FOR FIRE SUPPRESSION OVER PRESSURE PREVENTION

BACKGROUND OF THE INVENTION

Hazard suppression systems have long been employed for protecting areas containing valuable equipment or components, such as art galleries, data centers, and computer rooms. Traditionally, these systems utilize Halon, which is ideal for hazard suppression because it is capable of very quickly suppressing a hazard, it can be stored at relatively low pressures, and only a relatively small quantity is required.

However, in recent years the adverse environmental effects of Halon on the ozone have become evident, and many governmental agencies have banned further use of Halon. In some countries, existing Halon systems are being replaced by systems using more environmentally friendly inert gases such as nitrogen, argon, carbon dioxide, and mixtures thereof. Unlike the Halon-based fire suppression systems, inert gas-based systems use natural gases and do not contribute to atmospheric ozone depletion.

Combustion occurs when fuel, oxygen, and heat are present in sufficient amounts to support the ignition of flammable material. Inert gas fire suppression systems are based on reducing the level of oxygen in an enclosure to a level that will not sustain combustion. In order to extinguish a fire, inert gas stored in a large number of high-pressure cylinders is released into the enclosure to reduce the concentration of oxygen by displacing oxygen with the inert gas until combustion is extinguished. Typically, ambient air comprises 21% concentration by volume of oxygen. This concentration must be reduced to below 14% to effectively extinguish the fire. To reach this objective, a relatively large volume of gas must be released.

There are health and safety implications for facility personnel, particularly in relation to the reduction of oxygen in the atmosphere once the system is discharged. Careful calculation is required to ensure that the concentration of inert gas released is sufficient to control combustion, yet not so high as to pose a serious risk to personnel.

The replacement of Halon with inert gas for fire protection presents two issues with the system design. First, the delivery of a large amount of gas into a protected room within a short period time (fire codes in some countries require that the gas be delivered in less than one minute) may generate overpressure in the room which could potentially damage equipment in the room. Current industrial practice is to use a special, expensive vent in the room to prevent the overpressure. Second, unlike Halon, inert gas is stored under normal room temperature in gaseous form, rather than liquid form. To reduce the storage vessel volume, a very high pressure is preferred, typically around 100 bar. As a result, the gas distribution system must be capable of withstanding extremely high pressures. These two limitations are key factors in the cost of both new installation and retrofit.

The overpressure in the protected room is primarily caused by an uneven discharge of the inert gas from the pressure vessel. The pressure in the gas vessel decays exponentially during gas release, so the overpressure typically occurs in the first few seconds of the discharge. If the gas release can be throttled to a fairly uniform pressure profile over the duration of the discharge, overpressure in the protected room can be prevented while ensuring that the predetermined amount of inert gas is delivered within the required time.

Throttling the gas flow requires a valve with a controllable variable opening area. While this can be performed by a closed-loop servo valve, high initial and maintaining costs make it an unfavorable approach for fire protection. In addition, the increased system complexity of a closed-loop control can also introduce reliability concerns.

BRIEF SUMMARY OF THE INVENTION

A controlled pressure release valve prevents overpressure in a protected area upon delivery of gas. The valve includes a valve body, a slidable spool, a primary flow passage, a first and second chamber, a spring, a valve actuator, and a bleed passage. The valve body has a gas inlet and a gas outlet and houses the slidable spool which is movable between a first position and a second position within the valve body. The primary flow passage connects the gas inlet and the gas outlet and increases with lineal movement of the slidable spool. The first chamber is located adjacent a first end of the slidable spool and the second chamber is located adjacent a second end of the slidable spool. The sliding spool is biased towards the first position by a gas pressure applied by the second chamber and a spring. When the valve actuator is actuated, the bleed passage is opened to release gas pressure from the second chamber. The first and second chambers are in communication with the gas inlet and the slidable spool is urged to the second position at a rate that is a function of a pneumatic pressure differential between the first and second chambers.

DETAILED DESCRIPTION

Figure 1:
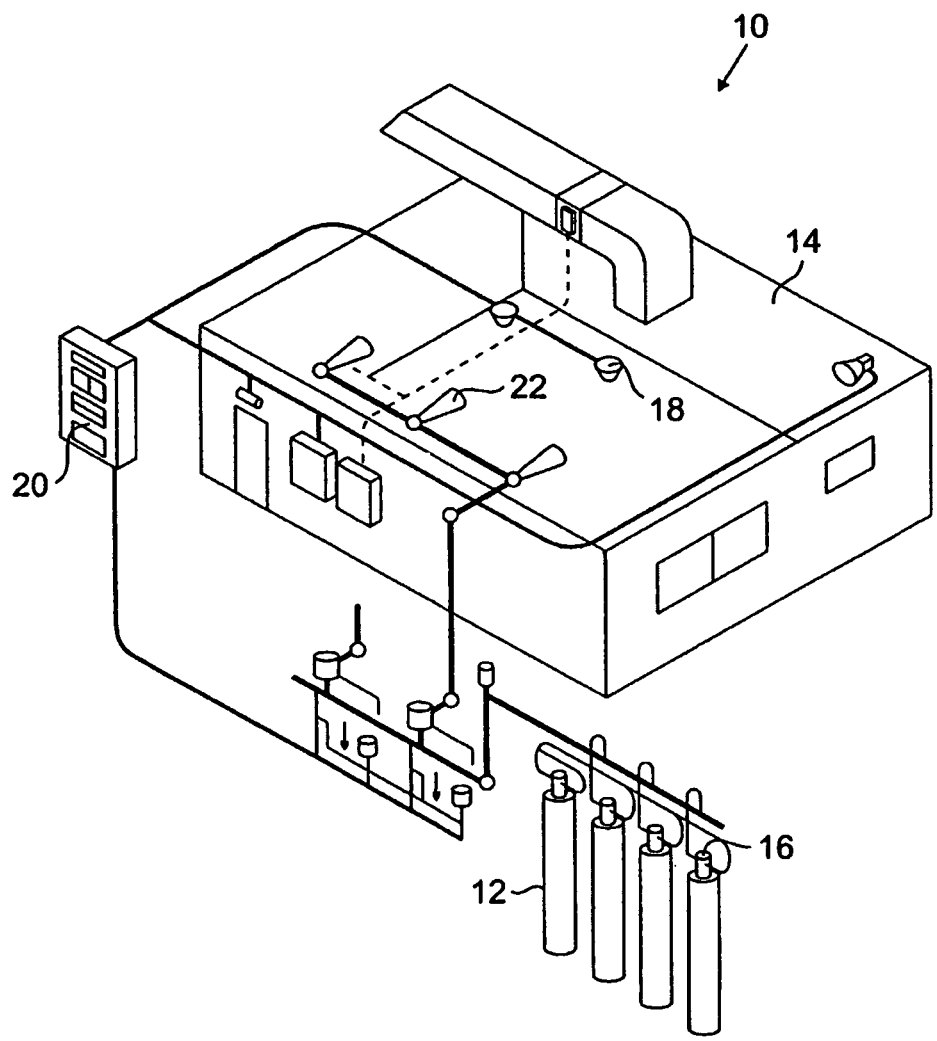
FIG. 1 is a schematic representation of a fire-suppression system in accordance with the present invention.

FIG. 1 is a schematic representation of an inert gas-based fire suppression system 10. A plurality of inert gas storage cylinders 12 are located in a storage area or room proximate an enclosed room 14 to be protected. Inert gas storage cylinders 12 contain inert gas to be released into protected room 14 in case of a fire or other hazard. Associated with each cylinder 12 is an open-loop pneumatic sliding flow control valve 16 for controllably releasing gas into protected room 14. When a fire is detected in protected room 14 by a fire detector 18 located in protected room 14, a control panel 20 opens flow control valves 16. Gas is then discharged into protected room 14 through discharge nozzles 22 to deplete the concentration of oxygen in protected room 14 and extinguish the fire.

Figure 2:
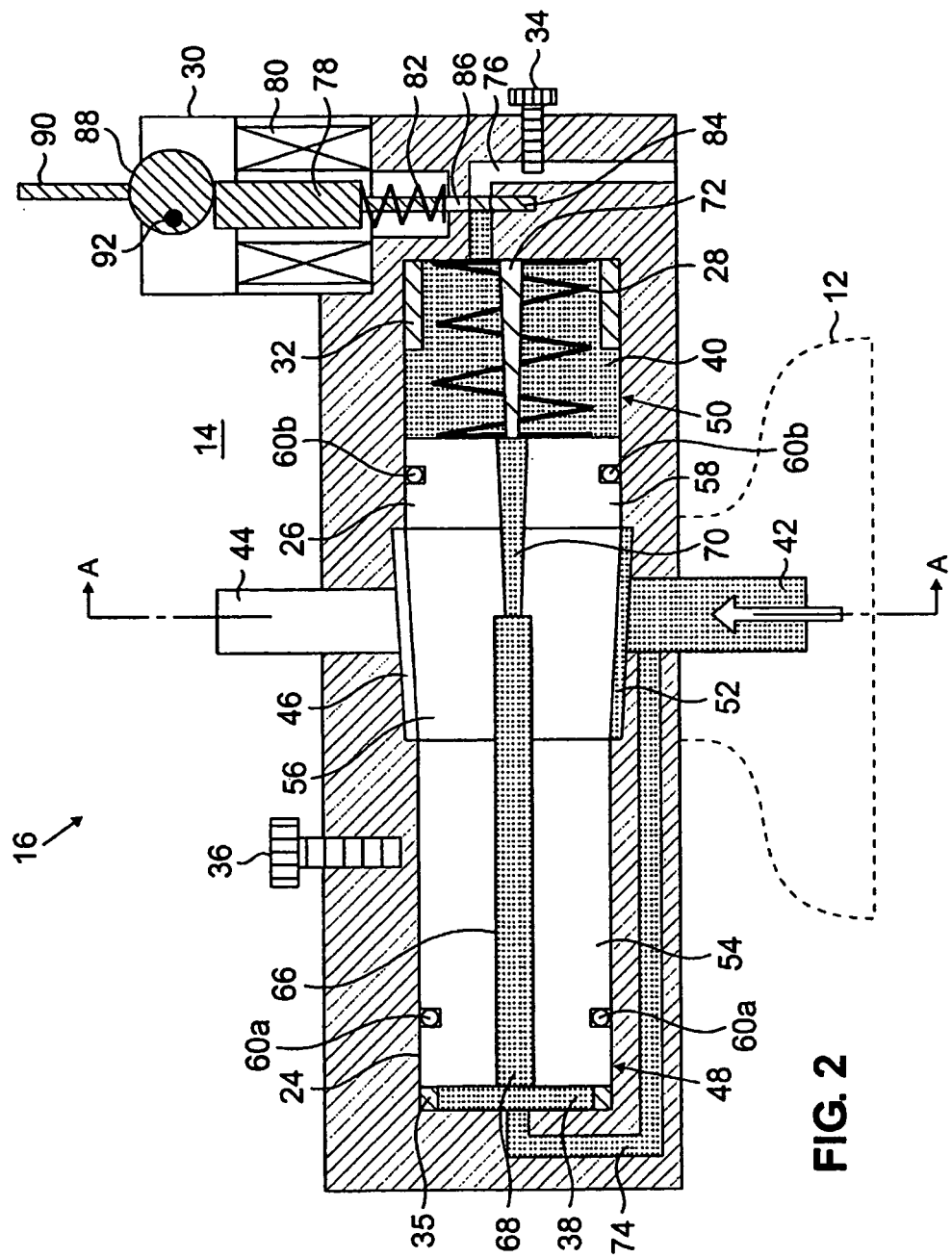
FIG. 2 is a sectional view of a first embodiment of a pneumatic flow control valve in a closed position in accordance with the present invention.
Figure 2A:
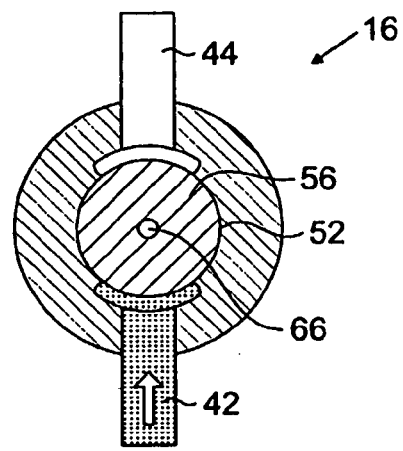
FIG. 2A is a cross-sectional view of the first embodiment of the pneumatic flow control valve in the closed position in accordance with the present invention.
Figure 3A:
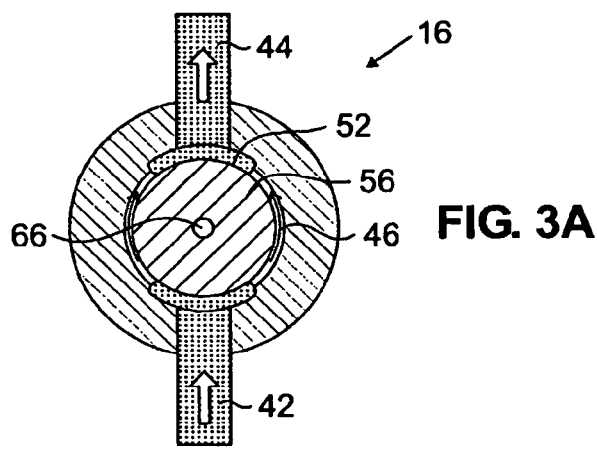
FIG. 3A is a cross-sectional view of the first embodiment of the pneumatic flow control valve in the open position in accordance with the present invention.
Figure 4A:
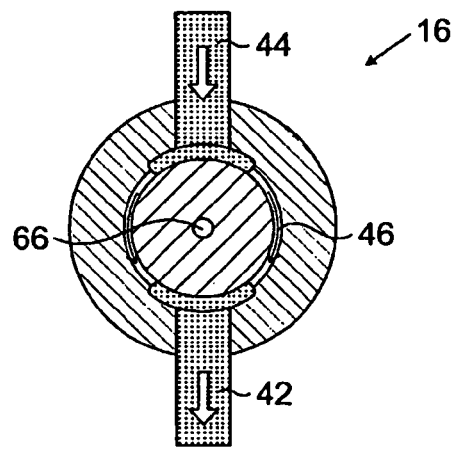
FIG. 4A is a cross-sectional view of the first embodiment of the pneumatic flow control valve in the charging position in accordance with the present invention.
Figure 3:
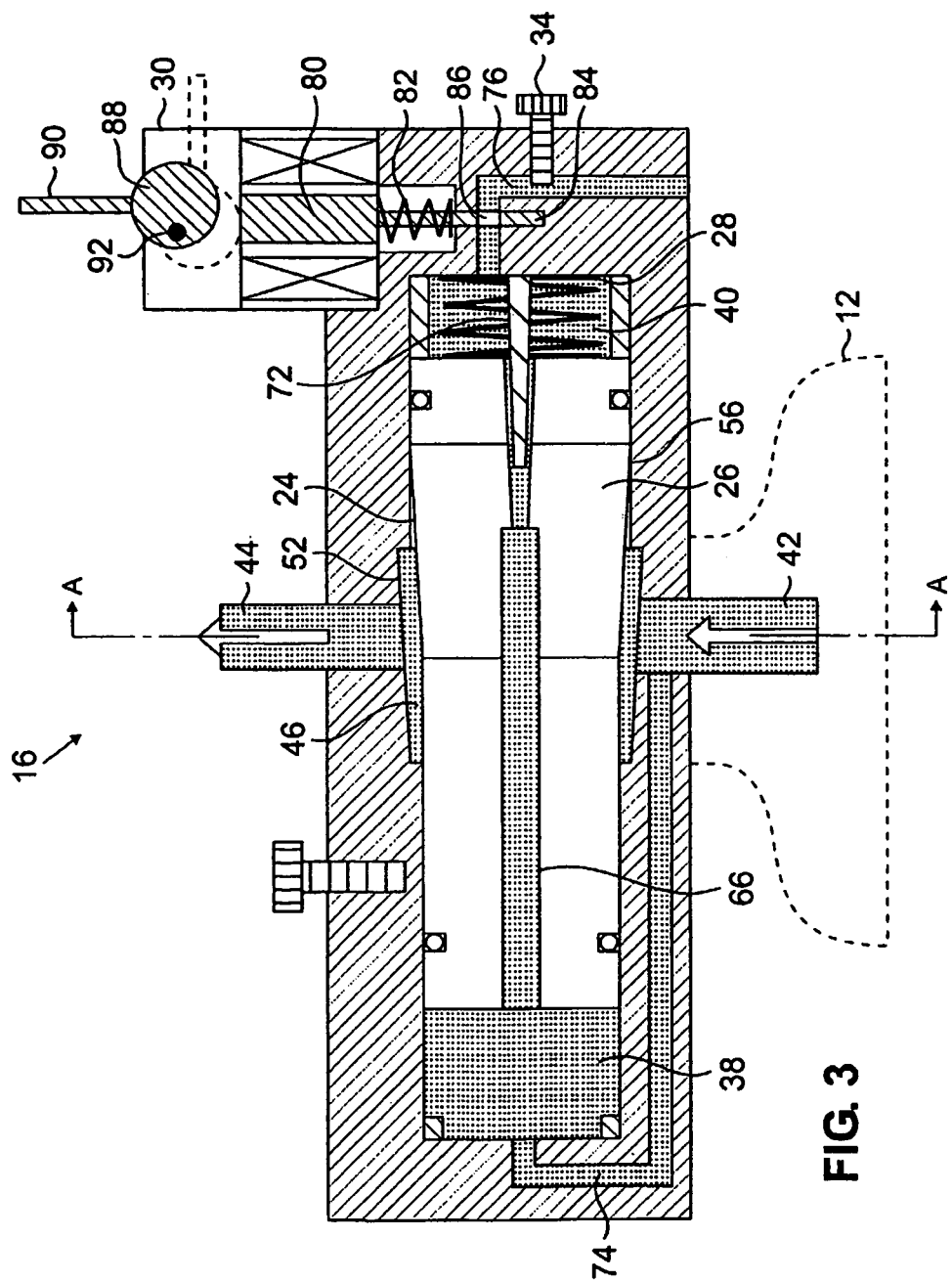
FIG. 3 is a sectional view of the first embodiment of the pneumatic flow control valve in an open position in accordance with the present invention.
Figure 4:
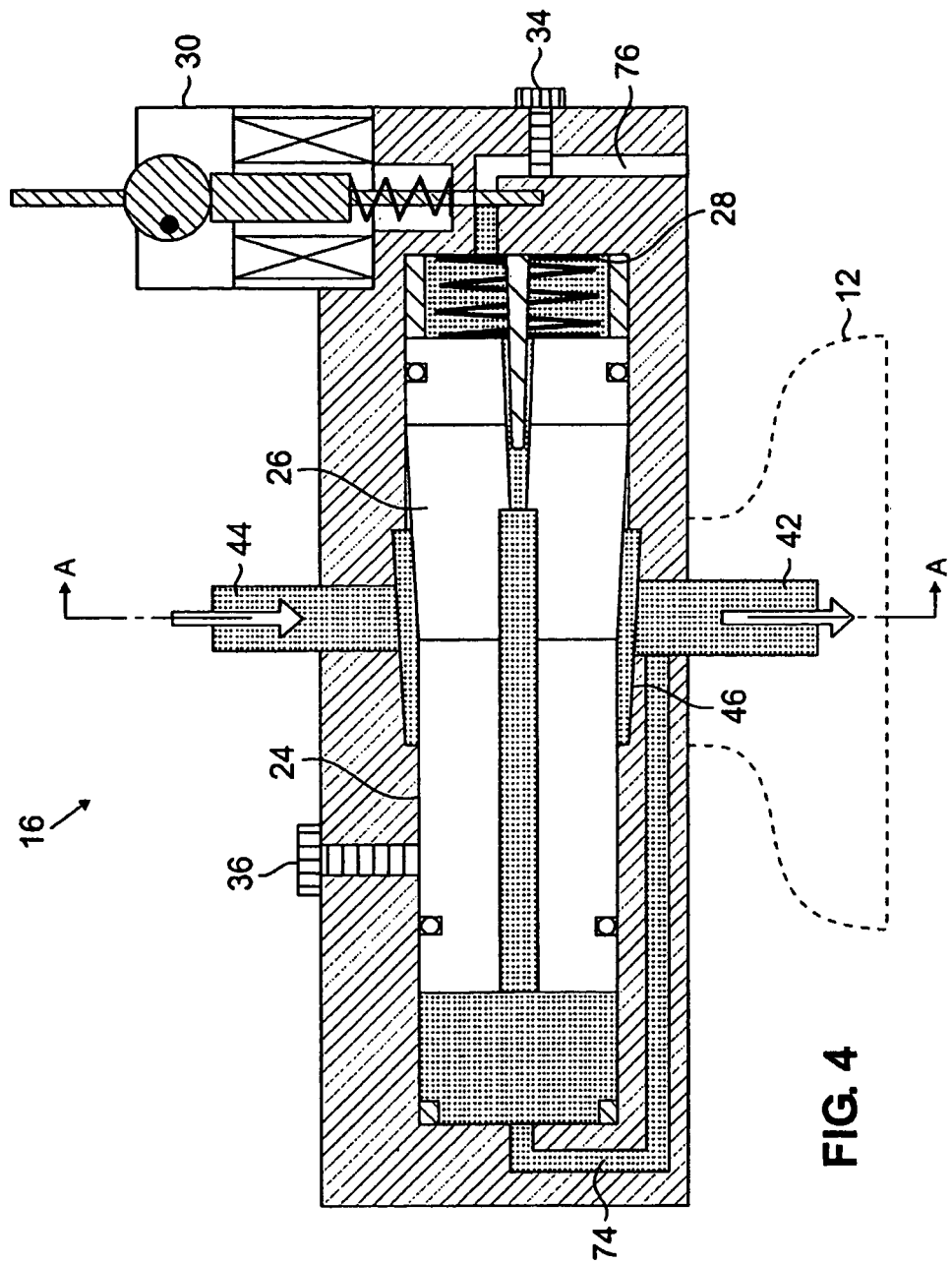
FIG. 4 is a sectional view of the first embodiment of the pneumatic flow control valve in a charging position in accordance with the present invention.

FIGS. 2-4 show sectional views of a first embodiment of flow control valve 16 in a fully closed position, a fully open position, and a recharging position, respectively. FIGS. 2A-4A show cross sectional views of flow control valve 16 at lines A-A when flow control valve 16 is closed, open, and recharging, respectively. FIG. 2 is a sectional view of flow control valve 16 in the fully closed position mounted on cylinder 12. Flow control valve 16 generally includes valve body 24, slidable spool 26, spring 28, solenoid pilot valve 30, ring stop 32, adjust screw 34, stop 35, and stop screw 36. Flow control valve 16 throttles the release of inert gas from cylinder 12 in order to control the pressure discharge into protected room 14.

Valve body 24 generally comprises control pressure chamber 38, back pressure chamber 40, gas inlet 42, gas outlet 44, and primary flow passage 46. Valve body 24 has first end 48, second end 50, and valve seat section 52 located between first and second ends 48 and 50. Spool 26 is housed in valve body 24 and is slidable between first end 48 and second end 50 of valve body 24. Valve body 24 and spool 26 form control pressure chamber 38 at first end 48 of valve body 24 and back pressure chamber 40 at second end 50 of valve body 24. Spool 26 is in a first (closed) position relative to valve body 24 when spool 26 is proximate first end 48 and is in a second (open) position relative to valve body 24 when spool 26 is proximate second end 50.

Spool 26 is sized to slidably engage valve body 24 and has head portion 54, conical mid-section 56, and tail portion 58. Diameter $D_T$ of tail 58 is larger than diameter $D_H$ of head 54. Diameter $D_C$ of conical section 56 increases in diameter from head 54 to tail 58. As shown in FIG. 2, when spool 26 is in the first position, conical section 56 sits in valve seat 52 of valve body 24. Because conical valve seat 52 has the same diameter $D_C$ as conical section 56, when conical section 56 sits in valve seat 52, conical section 56 seals primary flow passage 46 located between gas inlet 42 and gas outlet 44 such that gas cannot pass from gas inlet 42 to gas outlet 44. Head 54 carries O-ring 60a and tail 58 carries O-ring 60b that contact valve body 24 and seal any air passages between valve body 24 and spool 26. O-rings 60a and 60b ensure that gas does not escape from control pressure chamber 38 or back pressure chamber 40 through primary flow passage 46.

Internal flow restriction orifice 66 passes through the length of spool 26 and connects control pressure chamber 38 and back pressure chamber 40. Internal orifice 66 has a first portion 68 and a second portion 70. First portion of internal orifice 68 has a diameter $D_O$ and passes through head 54 and a portion of conical section 56. Second portion of internal orifice 70 has a variable diameter $D_V$ and passes through the remainder of conical section 56 and tail 58. Diameter $D_V$ of second portion of internal orifice 70 is smaller than diameter $D_O$ of first portion of internal orifice 68 where first and second portion of internal orifice 68 and 70 abut and then gradually increases such that diameter $D_v$ of second portion of internal orifice 70 is approximately equal to diameter $D_O$ of first portion of internal orifice 68 where second portion of internal orifice 70 is exposed to back pressure chamber 40.

In order to control the rate of gas entering back pressure chamber 40 from control pressure chamber 38 through internal orifice 66, a needle valve 72 extends from second end 50 of valve body 24. Needle valve 72 is positioned in back pressure chamber 40 and is sized to slidably engage second portion of internal orifice 70 when spool 26 moves toward the second position. Needle valve 72 is a variable diameter needle valve and gradually decreases the rate of gas flowing from control pressure chamber 38 into back pressure chamber 40 as needle valve 72 slides further into internal orifice 66.

Control pressure chamber 38 is located at first end 48 of valve body 24. Both control pressure chamber 38 and first end 48 have a diameter $D_1$ sized to accept head 54. When spool 26 is in the first position, control pressure chamber 38 receives head 54 of spool 26 such that the conical section 56 of spool 26 abuts first end 48 of valve body 24. Because Diameter $D_c$ of conical section 56 is larger than diameter $D_1$ of first end 48, first end 48 cannot accept conical section 56. Spool 26 is thus fully in the first position when conical section 56 abuts first end 48. Gas passes from cylinder 12 to control pressure chamber 38 through control flow passage 74 when flow control valve 16 is activated.

Back pressure chamber 40 is located at second end 50 of valve body 24. Back pressure chamber 40 has a diameter $D_2$, which is slightly larger than diameter $D_1$ of first end 48 and is sized to accept tail 58. Ring stop 32 is located in back pressure chamber 40 and is positioned to engage tail 58 when spool 26 moves toward the second position. Spring 28 is a compression spring and resists compression when in a relaxed state. Back pressure chamber 40 is connected to the atmosphere by bleed passage 76.

Solenoid valve 30 is located adjacent back pressure chamber 40 and controls the release of gas from back pressure chamber 40 through bleed passage 76. Solenoid valve 30 generally includes solenoid core 78, solenoid coils 80, solenoid spring 82, and needle valve 84 having a passage 86. Solenoid core 78 is connected to needle valve 84 and controls the position of passage 86 relative to bleed passage 76. When solenoid valve 30 is powered off, solenoid spring 82 biases solenoid core 78 such that passage 86 is not aligned with bleed passage 76 and gas cannot leave back pressure chamber 40. Because gas cannot leave back pressure chamber 40, the combination of the pneumatic pressure differential in back pressure chamber 40 and control pressure chamber 38 and the spring force of spring 28 keep primary flow passage 46 and flow control valve 16 closed. A cam 88 having a lever 90 and pivot point 92 are positioned to engage solenoid core 78 as a manual override if control panel 20 (shown in FIG. 1) or solenoid coil 78 is not functioning properly.

When spool 26 is in the first position, back pressure chamber 40 and bleed passage 76 are filled with inert gas from cylinder 12 and have the same pressure. Bleed passage 76 is blocked when solenoid valve 30 is deactivated, preventing gas from cylinder 12 from flowing into control pressure chamber 38. When gas cannot flow freely through valve body 24, spring 28 in combination with the gas pressure acting on the slightly larger diameter $D_2$ of back pressure chamber 40 bias spool 26 toward the first position. In this position, conical section 56 engages valve seat 52 to seal primary flow passage 46, maintaining flow control valve 16 in the closed position.

FIG. 2A is a cross-sectional view of flow control valve 16 in the closed position. When flow control valve 16 is in standby for fire protection, solenoid valve 30 is powered off and bleed passage 76 is closed. The bias forces keep spool 26 in the first position with conical section 56 engaging valve seat 52, sealing primary flow passage 46. Because the path of primary flow passage 46 is between valve seat 52 and conical section 56 (shown in FIG. 2), gas cannot pass through primary flow passage 46 to gas outlet 44.

FIG. 3 is a sectional view of flow control valve 16 in the open position. When there is a need to discharge gas from cylinder 12, solenoid valve 30 is actuated and passage 86 of needle valve 84 is aligned with bleed passage 76. With bleed passage 76 open, gas pressure in back pressure chamber 40 is released through bleed passage 76, also releasing gas pressure in internal orifice 66, control pressure chamber 38, control flow passage 74, and cylinder 12. Solenoid valve 30 is normally electrically activated by control panel 20 (shown in FIG. 1). In case of a power failure during a fire or other hazard, flow control valve 16 can also be opened manually by turning lever 90 at pivot point 92 by ninety degrees to activate cam 88 into contact with solenoid core 80. Solenoid core 80 is forced down and compresses spring 82 such that passage 86 of needle valve 84 is co-linear with bleed passage 76. Once bleed passage 76 is opened, the pneumatic pressure differential in control pressure chamber 38 and back pressure chamber 40 and the resistance of spring 28 control the velocity of spool 26 and the rate of gas discharge.

The initial pressure decrease in back pressure chamber 40 provides a force to break the friction (or "binding" due to long term storage) between conical section 56 and valve seating 52. As the gas in back pressure chamber 40 starts depleting through bleed passage 76, the pressure in cylinder 12 and valve body 24 attempts to equalize by gradually allowing gas to flow into control pressure chamber 38 from cylinder 12 and subsequently into back pressure chamber 40 via internal orifice 66. The flow restriction imposed by internal orifice 66 and variable diameter needle valve 72 creates a pressure differential between control pressure chamber 38 and back pressure chamber 40.

The cross-section of primary flow passage 46 is proportional to the displacement of spool 26, and flow control valve 16 opens from a minimal to a maximal area linearly when the displacement of spool 26 is a linear function of time. The rate of gas discharge can also be controlled by setting adjust screw 34 in bleed passage 76. The rate of pressure depletion in back pressure chamber 40 can be decreased if adjust screw 34 is screwed further into bleed passage 76 and the flow of gas from back pressure chamber 40 is inhibited. The rate of pressure depletion in back pressure chamber 40 can be increased if adjust screw 34 is unscrewed from bleed passage 76 and the flow of gas from back pressure chamber 40 is increased.

The net pneumatic force imposed on spool 26 is proportional to the pressure of valve body 24 and cylinder 12 and can be controlled by setting the bleed damping for a given design of internal orifice 66. Once spool 26 starts moving, needle valve 72 moves further into internal orifice 66 with the movement of spool 26 from the first position to the second position. As a result, a relatively constant pressure differential between control pressure chamber 38 and back pressure chamber 40 can be maintained regardless of the decaying pressure. The constant pressure differential results in spool 26 having a constant velocity. This requires that the diameter profile of needle valve 72 correspond to the exponentially decaying pressure in valve body 24 and cylinder 12 in order to ensure that the movement of spool 26 and the opening of primary passage 46 are linear. The combination of internal orifice 66 and manual setting of adjust screw 34 gives full control of gas release and allows for flexibility in release time for various system configurations without changing design.

As can be seen in FIG. 3A, when spool 26 moves from the first position to the second position, primary flow passage 46 is open and gas from cylinder 12 can pass through primary flow passage 46 and discharge at gas outlet 44. Primary flow passage 46 gradually opens as conical section 56 disengages from valve seat 52 and the distance between spool 26 and valve seat 52 gradually increases. Thus, as spool 26 moves toward the second position, gas is able to pass around spool 26 through primary flow passage 46 to gas outlet 44.

FIG. 4 shows flow control valve 16 after the gas in cylinder 12 has been discharged and flow control valve 16 needs to be recharged for subsequent use. After the inert gas has been released from cylinder 12 and flow control valve 16, spool 26 may be in an undefined position due to friction and spring biasing. As such, spool 26 needs to be properly positioned in valve body 24 prior to charging. This is done by first removing flow control valve 16 from cylinder 12. Gas outlet 44 is capped off, bleed passage 76 is opened, and flow control valve 16 is pressured at gas inlet 42 to move spool 26 toward the second position and open primary flow passage 46.

Once spool 26 is properly positioned in valve body 24, flow control valve 16 can be charged to full pressure while mounted on cylinder 12. Stop screw 36 is first lowered into valve body 24 to secure spool 26 in position. Solenoid valve 30 is then closed to block control flow passage 74 and adjust screw 34 is fully inserted into bleed passage 76. Gas is passed through gas outlet 44, which is used as an inlet during the charging process, until cylinder 12 and valve body 24 are fully pressurized. Once cylinder 12 and valve body 24 are fully charged, stop screw 36 is manually lifted from valve body 24 and spool 26 returns to the first position under the spring loading of spring 28 and the unbalanced pneumatic force, closing primary flow passage 46.

FIG. 4A is a cross-sectional view of flow control valve 16 during the charging process. When flow control valve 16 is charging, primary flow passage 46 is open to allow gas to pass into valve body 24 and cylinder 12.

Figure 5:
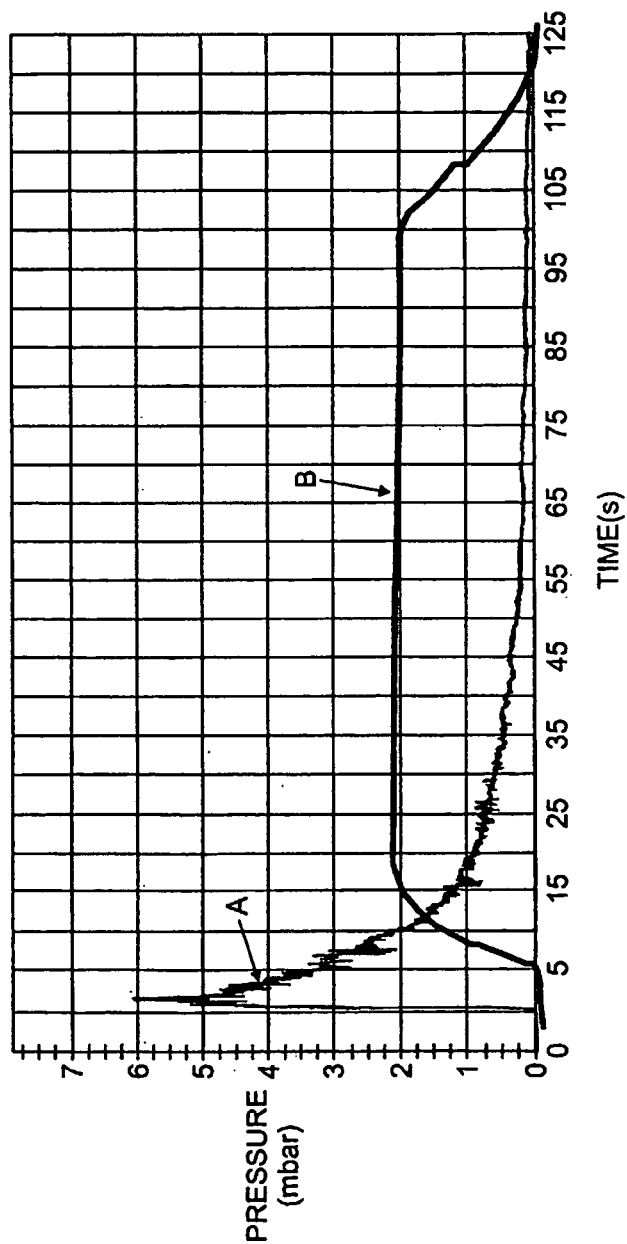
FIG. 5 is a graph comparing the rate of release of gas from a prior art flow control valve and the rate of release of gas from the pneumatic flow control valve in accordance with the present invention.

FIG. 5 is a graph of rate of release of gas A from a prior art flow control valve and rate of release of gas B from flow control valve 16. As can be seen in FIG. 5, prior art flow control valves release gas into an enclosed room at a dangerously high pressure in a very short period of time. This can pose a danger to any personnel and equipment in the enclosed room when the gas is released. By contrast, flow control valve 16 releases gas into the enclosed room at a controlled rate. The initial rate of release of gas gradually increases and generally levels off as flow control valve 16 opens. As the gas in flow control valve 16 is released and the level of gas remaining in flow control valve 16 decays, the pneumatic pressure differential in control pressure and back pressure chambers 38 and 40 and the rate of gas release gradually decrease until there is a nominal amount of gas left in flow control valve 16 and no more gas is emitted.

Figure 6:
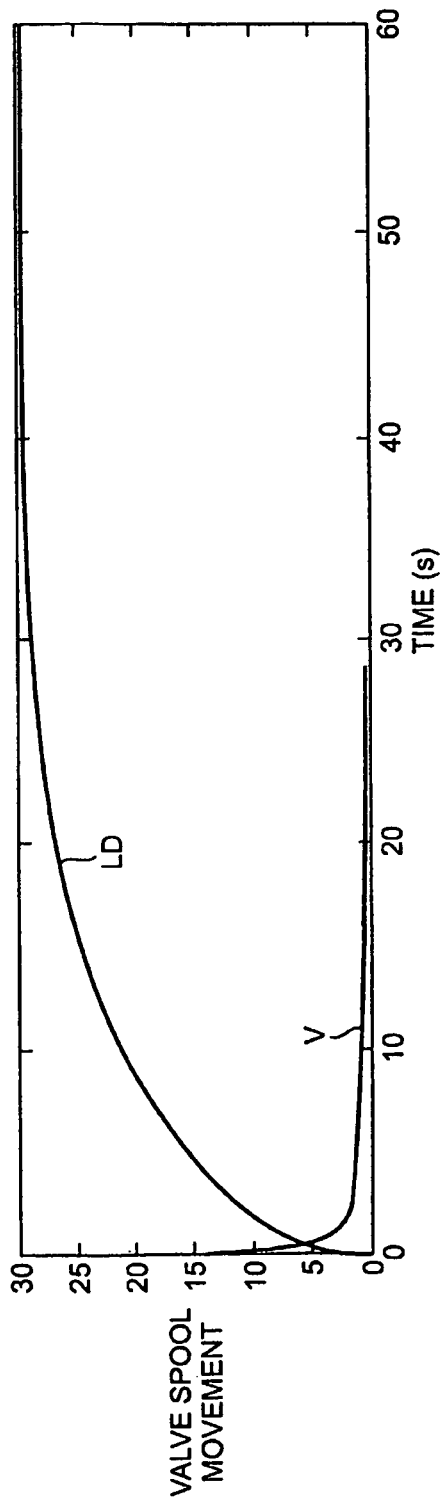
FIG. 6 is a graph of movement of a spool of the pneumatic flow control valve in accordance with the present invention as a function of time.

FIG. 6 is a graph showing linear displacement LD and velocity V of spool 26 as a function of time. As spool 26 moves from the first position to the second position, the displacement of spool 26 relative to the first position gradually increases as a function of time until tail 58 engages ring stop 32 of valve body 24 and flow control valve 16 is fully open. By contrast, the velocity of spool 26 decreases as a function of time. The initial velocity of spool 26 must be large enough for spool 26 to disengage from valve seat 52. After spool 26 is displaced from valve seat 52, the velocity of spool 26 gradually decreases as spool moves to the second position and cannot move any further in valve body 24.

Figure 7:
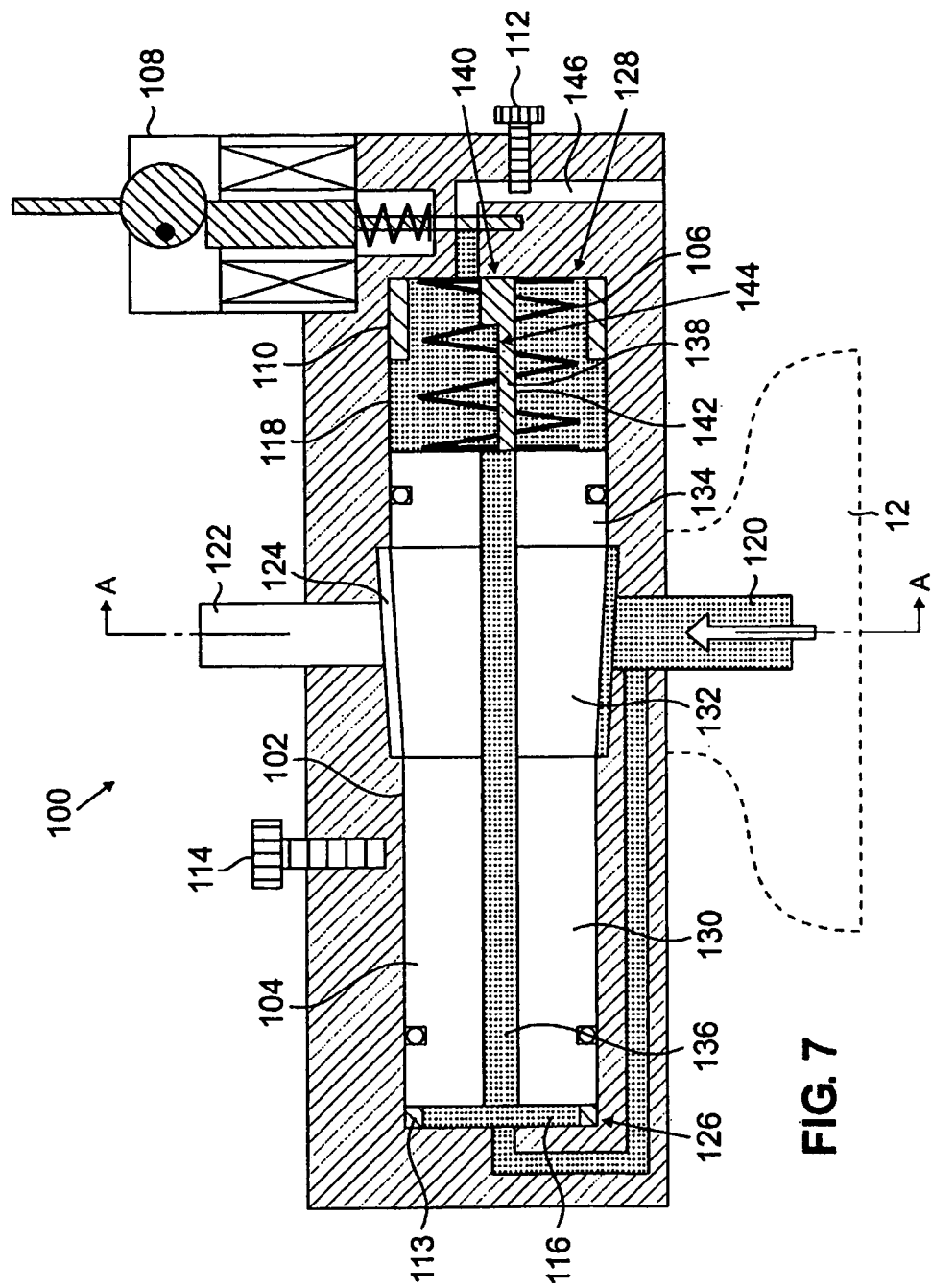
FIG. 7 is a sectional view of the second embodiment of the pneumatic flow control valve in a closed position in accordance with the present invention.
Figure 7A:
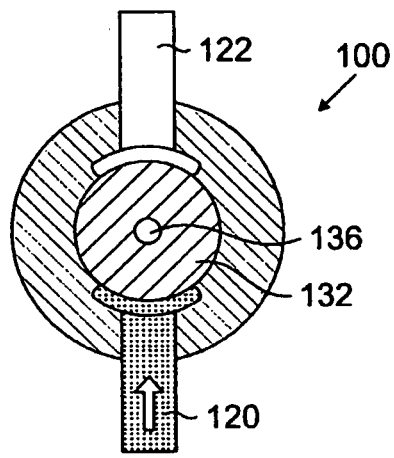
FIG. 7A is a cross-sectional view of the second embodiment of the pneumatic flow control valve in the dosed position in accordance with the present invention.
Figure 8A:
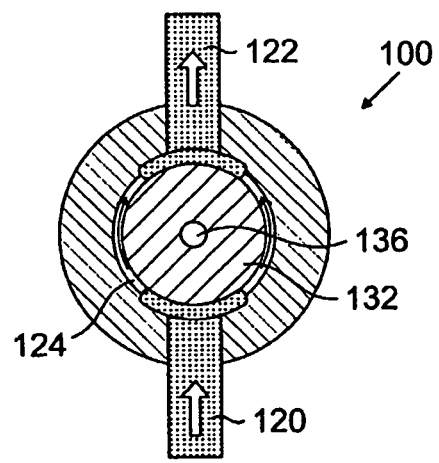
FIG. 8A is a cross-sectional view of the second embodiment of the pneumatic flow control valve in the open position in accordance with the present invention.
Figure 8:
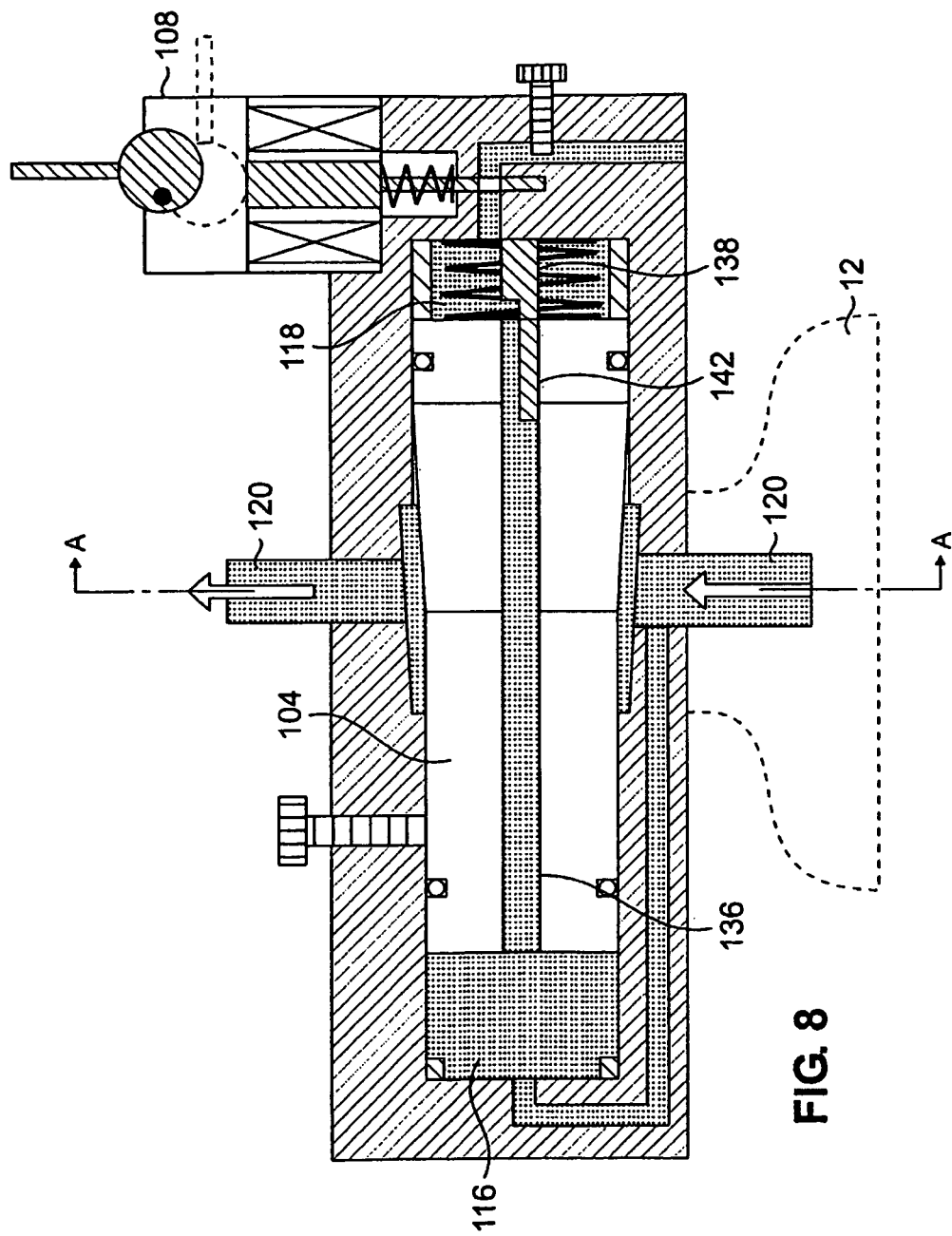
FIG. 8 is a sectional view of the second embodiment of the pneumatic flow control valve in an open position in accordance with the present invention.

FIGS. 7 and 8 are sectional views of a second embodiment of flow control valve 100 of the present invention in the closed and open positions, respectively, and will be discussed in conjunction with one another. FIGS. 7A and 8A show cross sectional views of flow control valve 100 as taken along lines A-A when flow control valve 100 is closed and open, respectively. Flow control valve 100 generally includes valve body 102, slidable spool 104, spring 106, solenoid pilot valve 108, ring stop 110, adjust screw 112, stop 113, and stop screw 114.

Valve body 102 generally comprises control pressure chamber 116, back pressure chamber 118, gas inlet 120, gas outlet 122, and primary flow passage 124. Spool 104 is sized to slidably engage valve body 102 between first end 126 and second end 128 of valve body 102. Spool 104 generally has head portion 130, conical mid-section 132, and tail portion 134.

The second embodiment of flow control valve 100 is identical to flow control valve 16 (discussed in FIGS. 2 and 3) in design and functionality, with the exception that internal orifice 136 and needle valve 138 of flow control valve 100 have different structures. Internal orifice 136 of flow control valve 100 has a constant diameter $D_O$ through the entire length of spool 104. Needle valve 138 protrudes from back pressure chamber 118 at first end 140 of needle valve 138 and slidably engages internal orifice 136 as spool 104 moves toward the second position. Needle valve 138 comprises protrusion 142 at second end 144 of needle valve 138. Protrusion 142 has a diameter $D_P$ smaller than diameter $D_O$ of internal orifice 136 in order to allow gas to controllably pass from control pressure chamber 116 to back pressure chamber 118.

As can be seen in FIG. 7A, when flow control valve 100 is in standby for fire protection, solenoid valve 108 is not powered on and bleed passage 146 is closed. The pneumatic pressure differential between control pressure chamber 116 and back pressure chamber 118 keeps spool 104 in the first position. As a result, gas cannot pass through primary flow passage 124.

As spool 104 moves from the first position toward the second position, primary flow passage 124 opens and gas from cylinder 12 can pass through primary flow passage 124 and discharge at gas outlet 122 (FIG. 8A).

Once the gas is discharged from cylinder 12 and valve body 102, flow control valve 100 is designed to be charged in the same manner as flow control valve 16 (discussed in FIG. 4).

The pneumatic flow control valve of the present invention controllably releases inert gas into an enclosed space upon detection of a fire or other hazard. The flow control valve has a spool housed in the valve body that is slidable from a first position to a second position. The slidable spool and the valve body form a control pressure chamber at one end of the valve body and a back pressure chamber at the opposite end of the valve body. The sliding spool is biased toward the first position by pressure applied by the back pressure chamber and a spring positioned in the back pressure chamber. An internal orifice passes through the sliding spool and connects the control pressure chamber and the back pressure chamber. As the sliding spool moves to the second position, the internal orifice engages a needle valve positioned in the back pressure chamber.

When the flow control valve is closed and the sliding spool is in the first position, a primary flow passage connecting the gas inlet and the gas outlet is fully closed. After a solenoid valve is actuated, pressure in the back pressure chamber is released, allowing gas to flow into the control pressure chamber. As the primary flow passage opens, gas can pass from the cylinder through the flow control valve and into the enclosed room. The competing forces of the spring in the back pressure chamber, the pneumatic pressure differential of the chambers, and the friction between the spool and the valve body control the velocity of the spool as it moves from the first position to the second position as well as the rate of gas release.

Although the present invention has been described with reference to preferred embodiments, workers skilled in the art will recognize that changes may be made in form and detail without departing from the spirit and scope of the invention.

The invention claimed is:

1. A controlled pressure release valve for preventing overpressure in a protected area upon delivery of gas, the valve comprising:
   a valve body having a gas inlet for connection to a gas container under pressure, a tapered valve seat, and a gas outlet for delivering gas to the protected area;
   a slidable spool housed in the valve body, the slidable spool formed of a cylindrical head portion on one side of a tapered midsection, the tapered midsection adjacent to a cylindrical tail portion of larger diameter than the cylindrical head portion, the cylindrical tail portion at an opposite side of the tapered midsection as the cylindrical head portion, and having a first end at the cylindrical head portion and a second end at the cylindrical tail portion, and the slidable spool being movable between a first position, wherein the tapered midsection is seated in the tapered valve seat, and a second position;
   a primary flow passage connecting the gas inlet and the gas outlet that is formed when the slidable spool moves away from the first position and the cylindrical head portion moves inside the tapered valve seat, wherein a cross-sectional area of the primary flow passage increases with lineal movement of the slidable spool as the cylindrical head portion lineally moves inside the tapered valve seat;
   a first chamber located adjacent the first end of the slidable spool, the first chamber having a first gas pressure, the cylindrical head portion being positioned between the first chamber and the tapered midsection, the cylindrical head portion defining a wall of the first chamber;
   a second chamber located adjacent the second end of the slidable spool, the second chamber applying a second gas pressure to the slidable spool such that the second gas pressure biases the slidable spool toward the first position;
   a spring for biasing the slidable spool in the first position;
   a bleed passage connected to the second chamber; and
   a valve actuator for actuating the valve by opening the bleed passage, wherein when the valve is actuated, the first and second chambers are in communication with the gas inlet and the slidable spool is urged to the second position at a rate that is a function of a decreasing pneumatic gas pressure in at least one of the chambers.

2. The valve of claim 1, wherein a velocity of the slidable spool is controlled by a pneumatic pressure differential between the first gas pressure and the second gas pressure, and the spring.

3. The valve of claim 2, wherein the first chamber has a first diameter and the second chamber has a second diameter, the second diameter being greater than the first diameter.

4. The valve of claim 3, wherein the valve actuator is a solenoid pilot valve.

5. The valve of claim 4, wherein the tapered valve seat and the tapered midsection close the primary flow passage when the slidable spool is in the first position and open the primary flow passage as the slidable spool moves to the second position.

6. The valve of claim 1, and further comprising a control flow passage connecting the gas inlet and the first chamber.

7. The valve of claim 1, and further comprising a protrusion engagable with the bleed passage for controlling gas pressure release from the second chamber through the bleed passage.

8. The valve of claim 7, and further comprising an internal passage through the slidable spool and a needle valve slidably engagable with the internal passage.

9. The valve of claim 8, wherein the internal passage has a constant diameter.

10. The valve of claim 8, wherein the internal passage is a variable diameter internal passage and the needle valve is a variable diameter needle valve.

11. The valve of claim 9, wherein the needle valve comprises a protrusion having a diameter less than the diameter of the internal passage.

12. The valve of claim 1, wherein the primary flow passage is at least partially defined between the tapered midsection and the tapered valve seat, and wherein the primary flow passage connects to the gas inlet at a first angular position of the tapered valve seat and the primary flow passage connects with the gas outlet at a second angular position of the tapered valve seat, wherein the first and second angular positions are circumferentially spaced apart around the tapered valve seat.

13. A controlled pressure release valve for preventing overpressure in a protected area upon delivery of gas, the valve comprising:
  a valve body having a gas inlet for connection to a gas container under pressure, a tapered valve seat, and a gas outlet for delivering gas to the protected area;
  a slidable spool housed in the valve body, the slidable spool formed of a cylindrical head portion that is adjacent to a tapered midsection that is adjacent to a cylindrical tail portion of larger diameter than the cylindrical head portion, and having a first end at the cylindrical head portion and a second end at the cylindrical tail portion, and the slidable spool being movable between a first position, wherein the tapered midsection is seated in the tapered valve seat, and a second position;
  a primary flow passage connecting the gas inlet and the gas outlet that is formed when the slidable spool moves away from the first position and the cylindrical head portion moves inside the tapered valve seat, wherein a cross-sectional area of the primary flow passage increases with lineal movement of the slidable spool as the cylindrical head portion lineally moves inside the tapered valve seat;
  a first chamber located adjacent the first end of the slidable spool, the first chamber having a first gas pressure;
  a second chamber located adjacent the second end of the slidable spool, the second chamber applying a second gas pressure to the slidable spool such that the second gas pressure biases the slidable pool toward the first position;
  a spring for biasing the slidable spool in the first position;
  a bleed passage connected to the second chamber;
  a valve actuator for actuating the valve by opening the bleed passage, wherein when the valve is actuated, the first and second chambers are in communication with the as inlet and the slidable spool is urged to the second position at a rate that is a function of a decreasing pneumatic gas pressure in at least one of the chambers;
  an internal passage through the slidable spool from the cylindrical head portion to the cylindrical tail portion fluidly coupling the first chamber and second chamber when the slidable spool is in the first position, and a needle valve slidably engagable with the internal passage;
  wherein the internal passage is a variable diameter internal passage and the needle valve is a variable diameter needle valve;
  wherein the variable diameter internal passage creates the controlled pressure differential between the first chamber and the second chamber as the variable diameter needle valve slidably engages the internal passage.

14. An open loop pneumatic flow control valve for controlled gas pressure release in a protected room, the open loop pneumatic flow control valve comprising:
  a valve body having a first end and a second end and a conical valve seat, and a gas inlet and a gas outlet;
  a slidable spool formed of a cylindrical head portion on one side of a conical midsection, the conical midsection adjacent to a cylindrical tail portion of larger diameter than the cylindrical head portion, the cylindrical tail portion at an opposite side of the conical midsection as the cylindrical head portion, and housed within the valve body and slidable between a first position, wherein the conical midsection is seated in the conical valve seat, and a second position, the slidable spool having a first end at the cylindrical head portion and a second end at the cylindrical tail portion;
  a spring for biasing the slidable spool towards the first position;
  a first chamber located between the first end of the valve body and the first end of the slidable spool, the cylindrical head portion being positioned between the first chamber and the tapered midsection, the cylindrical head portion defining a wall of the first chamber;
  a second chamber located between the second end of the slidable spool and the second end of the valve body, the second chamber having a gas pressure;
  a primary flow passage between the gas inlet and the gas outlet that is formed when the slidable spool moves away from the first position and the cylindrical head portion moves inside the conical valve seat, wherein the primary flow passage is closed when the slidable spool is in the first position, and wherein the primary flow passage is open when the slidable spool is in the second position;
  a bleed passage connected to the second chamber; and
  a valve actuator for actuating the valve by opening the bleed passage.

15. The open loop pneumatic flow control valve of claim 14, and further comprising a protrusion engageable with the bleed passage for controlling the gas pressure released from the second chamber.

16. The open loop pneumatic flow control valve of claim 14, wherein the primary flow passage opens from a minimal to a maximal area approximately linearly as the slidable spool is displaced linearly and more of the cylindrical head portion moves inside the conical valve seat.

17. The open loop pneumatic flow control valve of claim 16, and further comprising an internal passage extending from the first end of the slidable spool to the second end of the slidable spool and a needle valve extending into the internal passage.

18. The open loop pneumatic flow control valve of claim 17, wherein the internal passage is a variable diameter internal passage and the needle valve is a variable diameter needle valve, wherein the variable diameter internal passage creates a controlled pressure differential between the first chamber and the second chamber as the variable diameter needle valve slidably engages the internal passage.

19. The open loop pneumatic flow control valve of claim 17, wherein the internal passage has a constant diameter and the needle valve has a diameter less than the diameter of the internal passage, wherein the internal passage and the needle valve create a controlled pressure differential between the first chamber and the second chamber as the spool moves from the first position to the second position.

20. The open loop pneumatic flow control valve of claim 14, wherein the primary flow passage is at least partially defined between the conical midsection and the conical valve seat, wherein the primary flow passage connects to the gas inlet at a first angular position of the conical valve seat and the primary flow passage connects with the gas outlet at a second angular position of the conical valve seat, wherein the first and second angular positions are circumferentially spaced apart around the conical valve seat.

* * * * *